US008219683B2

(12) United States Patent
Banerjee et al.

(10) Patent No.: US 8,219,683 B2
(45) Date of Patent: Jul. 10, 2012

(54) ENABLING CREATION OF CONVERGED INTERNET PROTOCOL MULTIMEDIA SUBSYSTEM SERVICES BY THIRD-PARTY APPLICATION DEVELOPERS USING SESSION INITIATION PROTOCOL SUPPORT

(75) Inventors: Nilanjan Banerjee, West Bengal (IN); Dipanian Chakraborty, Kolkata (IN); Koustuv Dasgupta, New Delhi (IN); Sunil Goyal, Haryana (IN); Sumit Mittal, Uttar Pradosh (IN)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 12/414,790

(22) Filed: Mar. 31, 2009

(65) Prior Publication Data
US 2010/0246790 A1 Sep. 30, 2010

(51) Int. Cl.
G06F 15/173 (2006.01)
(52) U.S. Cl. .................... 709/226; 709/223; 709/225
(58) Field of Classification Search .......... 709/203, 709/223–226; 379/201.01, 202.02
See application file for complete search history.

(56) References Cited

U.S. PATENT DOCUMENTS

| 7,792,275 | B2* | 9/2010 | Tai et al. ................. 379/201.02 |
| 7,966,093 | B2* | 6/2011 | Zhuk ............................ 700/246 |
| 2003/0084177 | A1* | 5/2003 | Mulligan ...................... 709/203 |
| 2007/0041528 | A1 | 2/2007 | Menon et al. |
| 2007/0088836 | A1 | 4/2007 | Tai et al. |
| 2007/0209061 | A1 | 9/2007 | Dekeyzer et al. |
| 2007/0223462 | A1 | 9/2007 | Hite et al. |
| 2008/0306798 | A1* | 12/2008 | Anke et al. ........................ 705/8 |
| 2009/0041010 | A1* | 2/2009 | Bakker et al. .................. 370/352 |
| 2009/0287740 | A1* | 11/2009 | Banerjee et al. ........... 707/104.1 |
| 2010/0100634 | A1* | 4/2010 | Petesch ........................ 709/230 |
| 2010/0130239 | A1* | 5/2010 | Shaw ........................... 455/466 |
| 2010/0131647 | A1* | 5/2010 | Fernandez Alonso et al. ............................ 709/225 |
| 2010/0157822 | A1* | 6/2010 | Ivanov et al. ................. 370/252 |
| 2010/0218202 | A1* | 8/2010 | Fikouras et al. .............. 719/331 |
| 2011/0131277 | A1* | 6/2011 | Niemoeller et al. .......... 709/204 |
| 2011/0208853 | A1* | 8/2011 | Castro-Castro et al. ...... 709/223 |

OTHER PUBLICATIONS

Weibel et al., Service architecture for 3GPP IP Multimedia Subsystem—the IBM and Swisscom proof-of-concept experience, pp. 1-12, Feb. 2006, http://www.ibm.com.industries/telecom/doc/content/bin/swisscom_02.09.06a.pdf.
Crespi, a distributed mechanism to resolve dynamically Feature Interaction in the UMTS IP Multimedia Subsystem, pp. 1-8, May 2006.
SIP/IMS Client Applications, www.nmscommunications.com/NR/rdonlyres/9218414C-8C7C-4543-A898-BA5A5E5D7A5A/0/MP_IMS_Overview.pdf, Jun. 2005.

(Continued)

Primary Examiner — Ramy M Osman
(74) Attorney, Agent, or Firm — Ryan, Mason & Lewis, LLP

(57) ABSTRACT

A plurality of pure operator type rules are instantiated within a domain of a telecommunications operator and a plurality of pure application type rules are instantiated within a domain of a third party telecommunications application provider. The plurality of pure operator type rules and the plurality of pure application type rules are associated with a composite service. A plurality of network components are established to transmit given events of a plurality of protocol-level events to at least one of the domain of the telecommunications operator and the domain of the third party telecommunications application provider. The composite service is deployed in an execution engine of the third party telecommunications application provider.

22 Claims, 11 Drawing Sheets

OTHER PUBLICATIONS

Ren et al., Rule-Based On-Line Feature Interaction Detection for IMS Call Control Services, pp. 2038-2044, 2007.

Choi et al., Discussion Issues on IMS-based NGN, www.ttc.or.jp/e/external_relations/cjk/2ndNGN-WG_008.ppt, Nov. 12, 2004.

U.S. Appl. No. 11/943,677, filed Nov. 21, 2007 and titled, Method for Creating a Telecommunications Application.

U.S. Appl. No. 11/943,672, filed Nov. 21, 2007 and titled, System and Computer Program Product for Creating a Telecommunications Application.

* cited by examiner

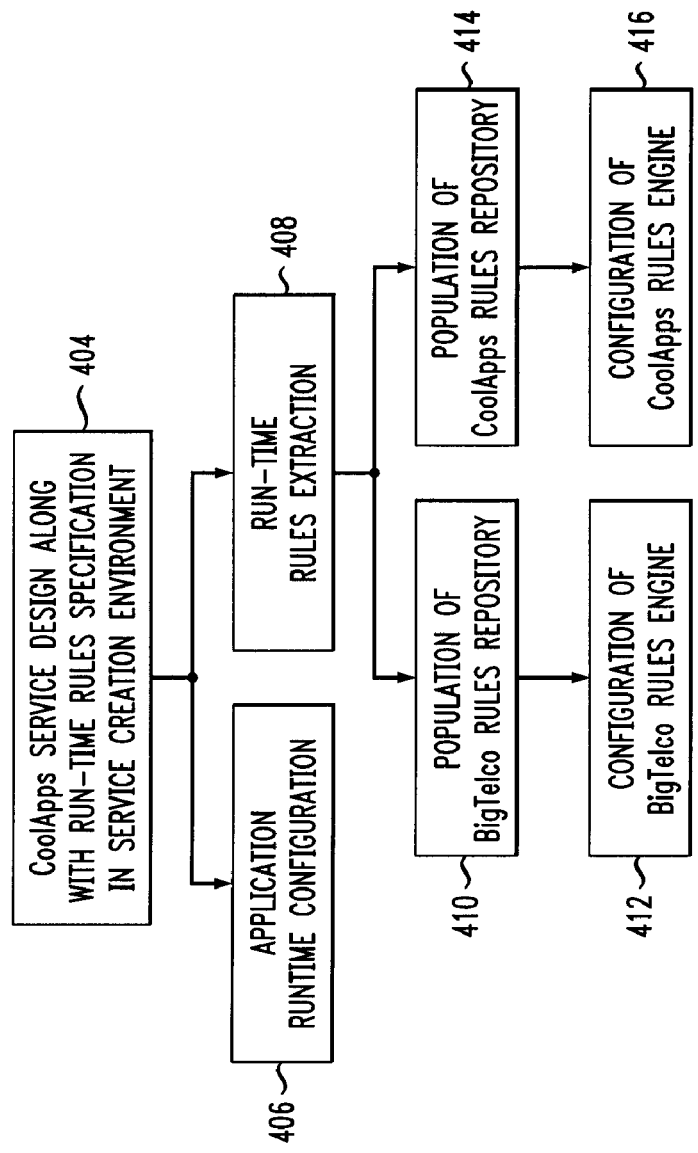
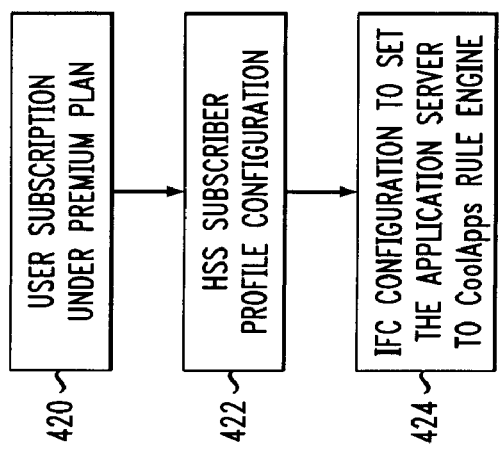
FIG. 4

ENABLING CREATION OF CONVERGED INTERNET PROTOCOL MULTIMEDIA SUBSYSTEM SERVICES BY THIRD-PARTY APPLICATION DEVELOPERS USING SESSION INITIATION PROTOCOL SUPPORT

FIELD OF THE INVENTION

The present invention relates to the electrical, electronic and computer arts, and, more particularly, to telecommunications services and the like.

BACKGROUND OF THE INVENTION

In an open-garden model, telecommunications (telecom) operators seek to provide third party application developers access to core telecom content and capabilities (for example, call, messaging, and/or presence). Such a model may provide new revenue opportunities for telecommunications companies (telcos), and may tap the potential of Internet Protocol Multimedia Subsystem (IMS) networks as a facilitator for Web 2.0-oriented applications (for example, mashups). Existing service creation paradigms are based on Service Oriented Architecture (SOA), for example, Business Process Execution Language for Web Services (BPEL4WS) for the Parlay-X set of web services APIs for the telephone network, whereby telecom operators expose services using application program interfaces (APIs) or protocol interfaces. Telecom services can be asynchronous (e.g. messaging), and continuous (e.g. call) in nature. As will be appreciated by the skilled artisan, the Parlay-X Web services are defined jointly by the European Telecommunications Standards Institute (ETSI), the Parlay Group, and the Third Generation Partnership Program (3GPP).

One prior art approach is set forth in US Patent Publication 2007-0088836, which discloses an application service invocation based on filter criteria. An Internet Protocol Multimedia Subsystem (IMS) device includes a memory configured to store a subscriber profile, where the subscriber profile includes at least one criterion relating to an event that occurs after a session request has been forwarded to a terminating party. The IMS device further includes a processor configured to invoke at least one application service for a session based on the at least one criterion in the subscriber profile.

Another prior art approach is set forth in US Patent Publication 2007-0209061, which discloses apparatuses and a method for controlling access to an IP multimedia system from an application server. A security node controls access to an internet protocol multi-media system from an application server outside the system. The multi-media system includes a session protocol server (Serving Call Session Control Function or S-CSCF) and a subscriber database (Home Subscriber Server or HSS). The security node comprises a database access control node operable to control access to the subscriber database (HSS) from the application server, a session message control node operable to control communication of the messages to the session protocol server from the application server, and a control information database for storing control data. The control data specifies conditions for accessing the subscriber database (HSS) and for communicating with the session protocol server (S-CSCF). The database access control node is operable to control access to the subscriber database in accordance with the control data, and the session message control node is operable to control communication of messages to the session protocol server in accordance with the control data. Embodiments set forth in US Patent Publication 2007-0209061 can provide a facility for an application server operating externally to an internet protocol multi-media system network to have controlled access to resources within the network. For example, the access may be controlled in accordance with a policy agreed between an operator of the network and an operator of the application server.

SUMMARY OF THE INVENTION

Principles of the invention provide techniques for enabling creation of converged internet protocol multimedia subsystem services by third-party application developers using session initiation protocol support. In one aspect, an exemplary method (which can be computer-implemented) includes the step of instantiating a plurality of pure operator type rules within a domain of a telecommunications operator and a plurality of pure application type rules within a domain of a third party telecommunications application provider. The plurality of pure operator type rules and the plurality of pure application type rules are associated with a composite service. The method further includes establishing a plurality of network components to transmit given events of a plurality of protocol-level events to at least one of the domain of the telecommunications operator and the domain of the third party telecommunications application provider; and also includes deploying the composite service in an execution engine of the third party telecommunications application provider.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention may offer one or more of the following technical benefits:

i) Use of fine-grained telecom events in run time rules for next generation integrated telecom and IT applications
ii) Separation of application rules from operator rules and enabling their run-time execution appropriately.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 4 shows flow charts pertaining to subscription phase and application design time, under a premium plan, according to yet another aspect of the invention;

DETAILED DESCRIPTION OF PREFERRED EMBODIMENTS

As noted above, in an open-garden model, telecommunications (telecom) operators seek to provide third party application developers access to core telecom content and capabilities (for example, call, messaging, and/or presence). Such model may provide new revenue opportunities for telecommunications companies (telcos), and may tap the potential of Internet Protocol Multimedia Subsystem (IMS) networks as a facilitator for Web 2.0-oriented applications (for example, mashups). Application developers, however, need fine-grained control on telecom (protocol) events for creating richer value-added services; for example, re-routing calls depending on end-device status. If such "rules" stay in the operator's domain, then the flexibility of creating richer applications is lost.

Existing service creation paradigms are based on Service Oriented Architecture (SOA), for example, BPEL4WS for Parlay-X, whereby telecom operators expose services using application program interfaces (APIs) or protocol interfaces. Telecom services can be asynchronous (e.g. messaging), and continuous (e.g. call) in nature and hence SOA is inadequate for service creation that requires fine-tuned control on telecom protocols. An event oriented approach is believed to be more suitable for next-generation IMS service creation. Heretofore, there has been no method or apparatus to let the application developer exploit the underlying telecom protocol-level behavior.

Aspects of the invention provide an integrated service creation environment for third party application developers to incorporate run-time rules for telecom services, including rules that require the application to handle telecom protocol-specific events. "Rules" have the following characteristics. They can be specific to the telecom operator or to the application alone. They might require underlying Telecom protocol events to be exchanged between the operator and the application's platform. They may be dependent on service level agreements (SLAs) and/or policies between the operator and the application provider. They are preferably decoupled from application logic.

In one or more embodiments of the invention, rules are provisioned at the appropriate component (application provider or operator infrastructure); the apparatus takes care of provisioning the rules at either the operator's infrastructure or at the application provider's platform, and of establishing the channel necessary for transmission of appropriate telecom protocol and/or functionality-specific events from the telecom operator's infrastructure. Advantageously, these aspects, in one or more embodiments, enable protocol-level mediation of rules to provide run-time rule execution support, without any change to the application.

One or more embodiments of the invention progress the state-of-the-art service creation and execution platforms for applications requiring fine-tuned control on telecom protocols and functionalities.

Figure 1:
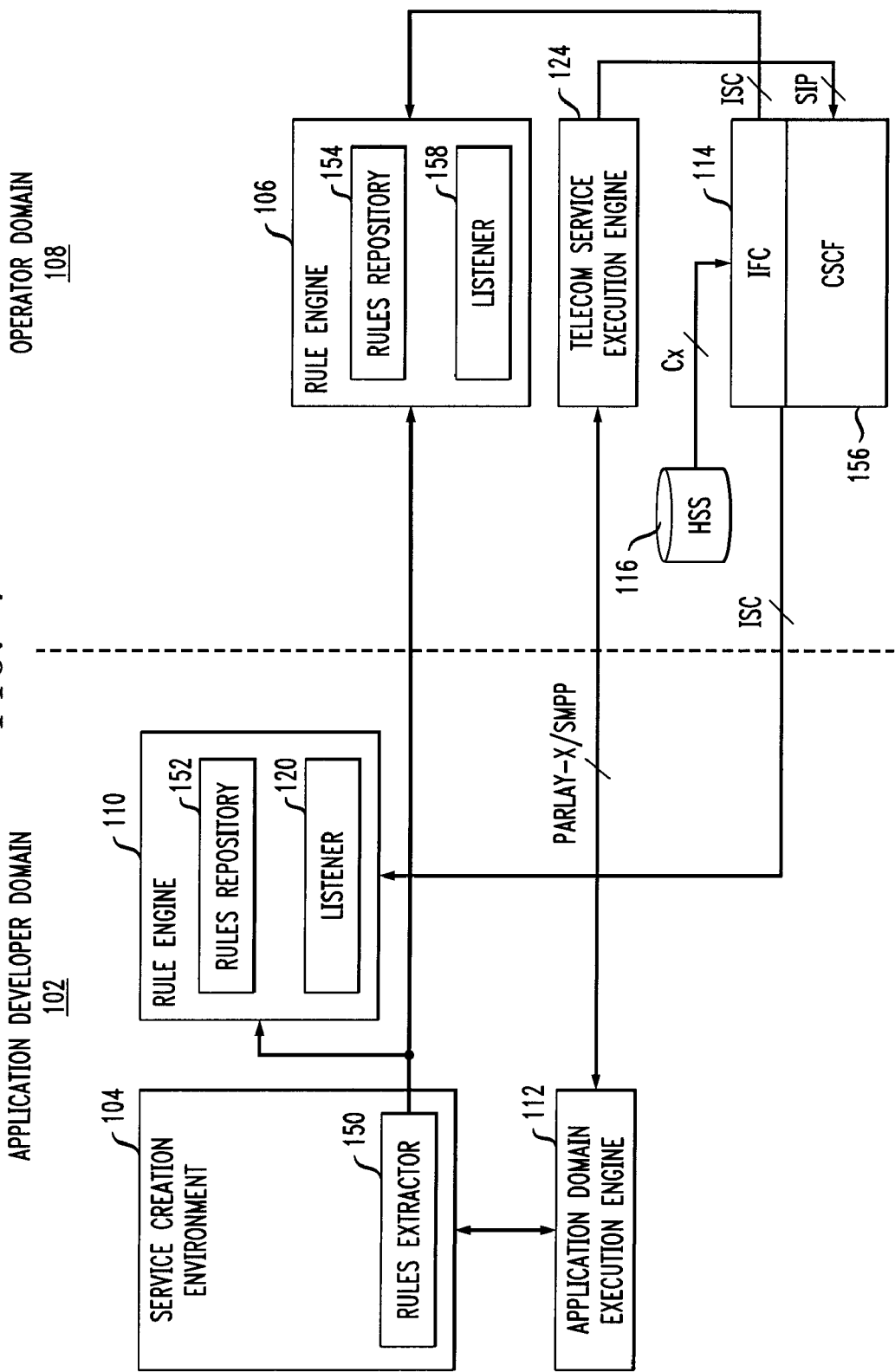
FIG. 1 shows an exemplary architecture diagram, according to an aspect of the invention.

In one aspect, an exemplary method is provided for third party telecom applications to create services requiring fine-tuned control on telecom protocols. With reference to FIG. 1, in an application developer domain 102, one or more composite services are specified through a service composition environment 104 (also referred to as a service creation environment). Furthermore, one or more rules are specified; such specification includes the type of rule (for example, pure-application or pure-operator). Pure-operator rules are instantiated in the rule engine 106 of the telecom operator's platform within operator domain 108. Pure-application rules are instantiated in the rule engine 110 of the application provider's platform within application developer domain 102. Further steps include setting up of network components (initial Filter Criteria or iFC 114 and HSS 116) to transmit protocol level events to appropriate rule engines 106, 110; as well as deployment of the service in the application provider's execution engine 112.

In another aspect, an exemplary method is provided for run-time rule execution of services created using the method discussed just above, based on event-oriented service composition. In this aspect, during application execution, telecom services are invoked by the application domain execution engine 112. The telecom services are executed in the Telecom Service Execution Engine 124. A listener 120 in the rule engine 110 listens for exchange of protocol-level conversational messages (for example, Session Initiation Protocol (SIP) INVITE, SIP provisional responses) between parties (applications and users) engaged in the service, to identify protocol level events which are of interest to the concerned application. The rule engine 110 evaluates business and functional rules, which are pure-application rules, and triggers actions at required points during the network level events (on behalf of the originating or terminating party, or both). Similarly, a listener 158 in the rule engine 106 listens for exchange of network level events that take place as a result of execution of the telecom services. The rule engine 106 evaluates business and functional rules, which are pure-operator rules.

Note that SMPP is Short Message Peer-to-peer protocol which could be used just as Parlay-X to invoke a telecom service embedded in an application. Furthermore, IMS Service Control (ISC) interface is defined in IMS architecture as call processing control interface between S-CSCF and SIP Application Server. In addition, Cx is the diameter based interface to HSS used by CSCF 156 to interact with HSS 116.

In still another aspect, an exemplary method is provided for instantiation of rules in the appropriate infrastructure, within the above exemplary method for third party telecom applications to create services requiring fine-tuned control on telecom protocols. In this aspect, if the "action" part of a rule is used to determine the rule-type, "pure-application" rules are thereby deployed at the rule engine 110 of the application developer, while "pure-operator" rules are transmitted to the telecom operator's infrastructure 108 using any mutually agreed protocol. Rule engines 106, 110 at the operator and application provider's platforms, respectively, are initialized with the identified rules.

In a further aspect, an exemplary method is provided for determining rule-type, within the above exemplary method for instantiation of rules in the appropriate infrastructure. In this aspect, if the "action" part of a rule is a service that is owned by a telecom operator and not exposed to applications using service access protocols (for example, Media Gateway Functions), then the rule is of type "pure-operator." If the "action" part of a rule is a service that is purely owned by the application, then the rule is of type "pure-application." If the "condition" part of a rule is owned by the application and the "action" part is exposed to either party, then the rule is of type "pure-application." In both the cases the owning "application" refers to the applications developed by the third parties using one or more embodiments of the service creation framework described herein. If the "condition" part of a rule is owned by the telecom operator and the "action" part is exposed to either party, then the rule is of type "pure-operator." If a rule fails either of these classifications, then the rule stands as "un-classified."

IFCs and SCL Rules

In one or more approaches not employing aspects of the invention, the iFCs 114 are defined with respect to each individual subscriber and are stored in the subscriber profiles of HSS 116, which are downloaded to the CSCF 156 for filtering out SIP requests based on Service Point Triggers (SPTs) and for forwarding to a particular SIP Application Server (SIP AS). An iFC includes a condition to be met by the SIP request (for example, INVITE) and the address of an application server to which the SIP request should be routed in that case. The iFCs 114 for the subscribers are configured during the initial registration of the subscribers. An application developer may want the iFC in the operator domain to send all the SIP requests for its subscribers to an application server hosted in the developer domain 102. During the initial subscriber registration, the HSS information for all the subscribers associated with the application developer is configured in such a way that the iFC gets configured to forward all the SIP requests generated by the subscribers to the application server of the application developer.

In one or more embodiments of the invention, rules are more expressive than iFCs, as they can implement diverse actions for the SPT events—they can maintain call states and can possibly modify them as well (rule engine acting in the Back-to-Back User Agent or B2BUA mode). In one or more embodiments, rules are essentially implemented and executed within the (SIP) Application Server 110 in the application developer domain 102. The SIP rule execution engine and the rules repository 152 in the SIP AS constitute the Service Control Layer or SCL. For example, a pre-paid call can be terminated based on the duration of the call—this involves rules (for example, rules of a business enterprise) as well, which could be enforced by the application developers independent of the operator. One or more embodiments allow these rules to be hosted in the Application Developer's domain 102, thus implementing the application developer's policies and optionally supplementing telco operator rules hosted in the operator domain 108.

Example

Consider CoolApps, a third-party application developer company, which has entered a partnership with a telecom service provider, BigTelco, to launch innovative value-added services for its IMS customers. One of the popular services, known as Family Finder, allows parents and children to stay in touch with each other. Bob and Sue regularly use this service from their personal computer (PC) to track the location of their child (Joshua) and to communicate with him using a SIP-based Click-To-Call feature available as part of this service. Joshua can also use his mobile device to call up his parents using Family Finder. The family uses a "normal" plan available from CoolApps, whereby they get twenty calls free each month and each additional call is charged by Big-Telco at the rate of $1/minute. Jack and Ann are another couple who make frequent international trips and use the Family Finder service to stay in touch with each other. They are subscribed to a "premium" plan available from CoolApps, which allows them to make unlimited calls to each other's phones. Further, when Ann calls her home phone and finds it ringing, the call is automatically forwarded by CoolApps to Jack's SIP phone at work.

Figure 2:
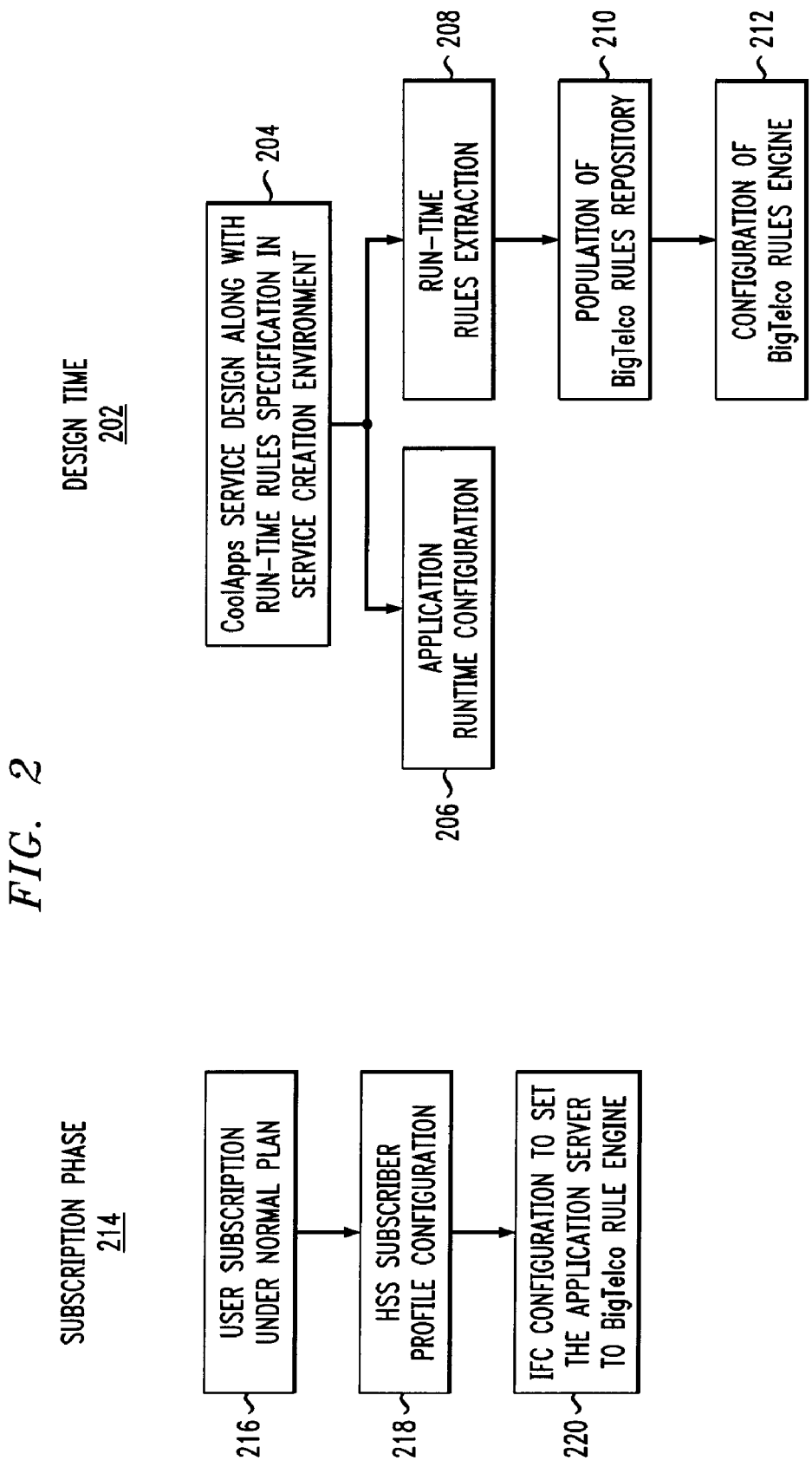
FIG. 2 shows flow charts pertaining to subscription phase and application design time, under a normal plan, according to another aspect of the invention.

With reference to FIG. 2, in the case of the normal plan, at design time 202, in block 204, CoolApps configures its rule engine 110 and subscribes devices of Bob, Sue, and Joshua. It also configures its own charging platform to indicate that these users are to be subscribed to the normal plan of Cool-Apps, as in block 206. As shown in blocks 208, 210, and 212, BigTelco configures its rule engine 106 to indicate that Bob, Sue, and Joshua are normal users, with its charging platform being updated to reflect the call charging details, that is, twenty free calls, 1$/minute for additional calls through Cool-Apps. During the subscription phase 214, users Bob and Sue subscribe under the normal plan, as per block 216 (they of course may subscribe on behalf of Joshua as well). HSS subscriber profile is configured in element 116, as per block 218. The iFC configuration is set in element 114, as per block 220, to set the application server to the BigTelco rule engine 106.

Figure 3:
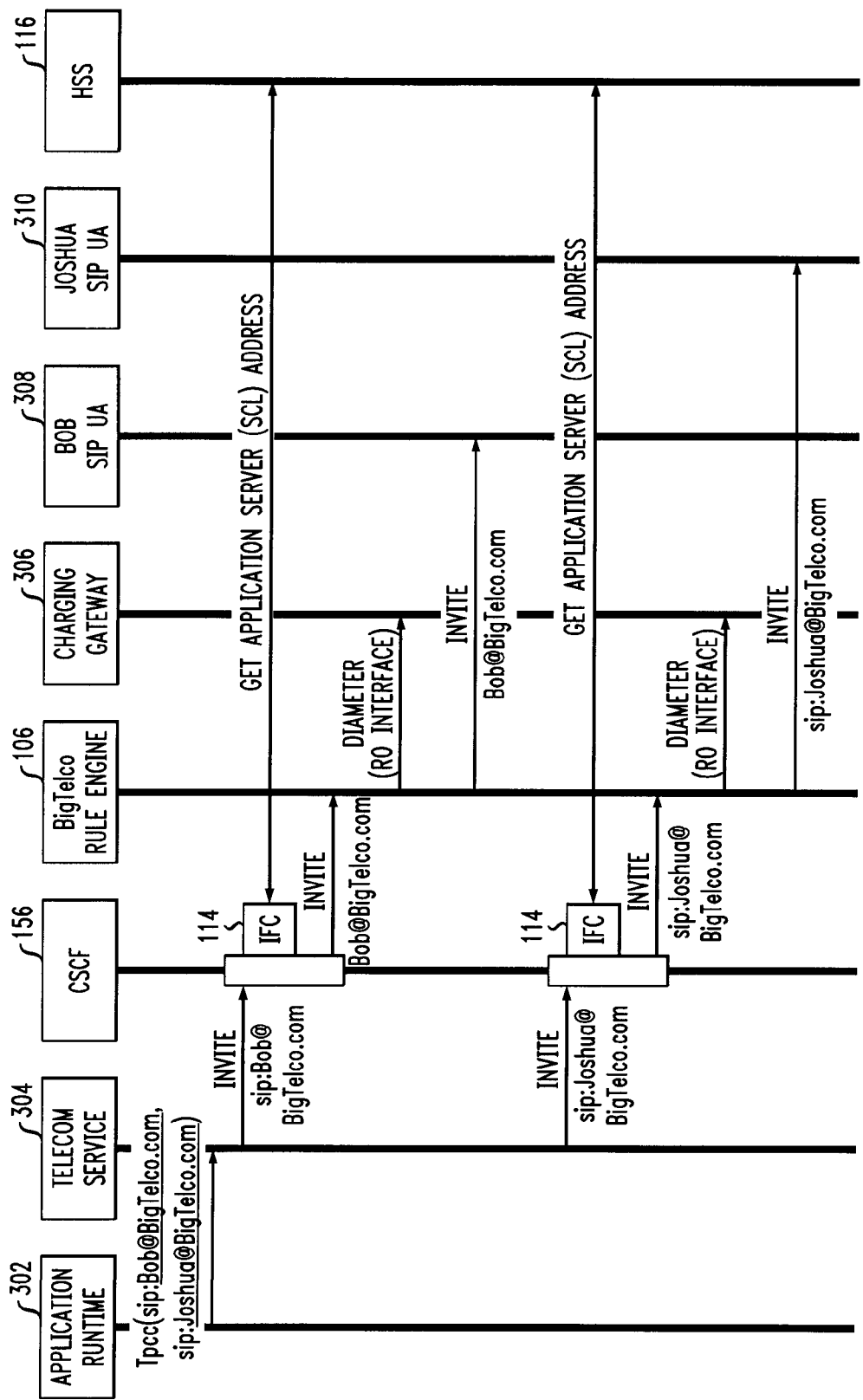
FIG. 3 is an execution time timeline, under the normal plan, according to still another aspect of the invention.

With reference to FIG. 3, at execution time, there is an authorization for the user (here, Bob) calling Joshua. Initially, note the arrow between application runtime 302 and telecom service 304. This triggers invites for each party from the telecom service 304 to the BigTelco rule engine 106 via iFC 114 and CSCF 156. The invites are then passed to the Bob SIP UA 308 or the Joshua SIP UA 310 as the case may be. In each case, the application server address is obtained from HSS block 116. Charging of the user by BigTelco takes place (for example, $1/minute after the free calls are over) using charging gateway 306 (note arrows labeled "Diameter (Ro Interface)." The charging gateways could be any server with real-time charging gateway functionality, which may interact with the application over a Diameter (Ro) interface or any other interface.

With reference to FIG. 4, in the case of the premium plan, at design time 402, in block 404, CoolApps configures its rule engine 110 and subscribes devices of Jack and Ann. It also configures its own charging platform to indicate these users to be subscribed to the premium plan, as in block 406. Finally, it sets a rule in the local rule engine 110 for call forwarding. As shown in blocks 408, 410, 412, 414, and 416, BigTelco configures its rule engine 106 to indicate Jack and Ann as premium users with its charging platform being updated to reflect the call charging details, that is, unlimited calls through CoolApps. In particular, run-time rules extraction by rules extractor 150 takes place in step 408, with population of BigTelco rules repository 154 in step 410 and configuration of BigTelco rules engine 106 in step 412. Furthermore, population of CoolApps rules repository 152 takes place in step 414 and configuration of CoolApps rules engine 110 in step 416.

During the subscription phase 418, users Jack and Ann subscribe under the premium plan, as per block 420. HSS subscriber profile is configured in element 116, as per block 422. The iFC configuration is set in element 114, as per block 424, to set the application server to the CoolApps rule engine 110.

Figure 5:
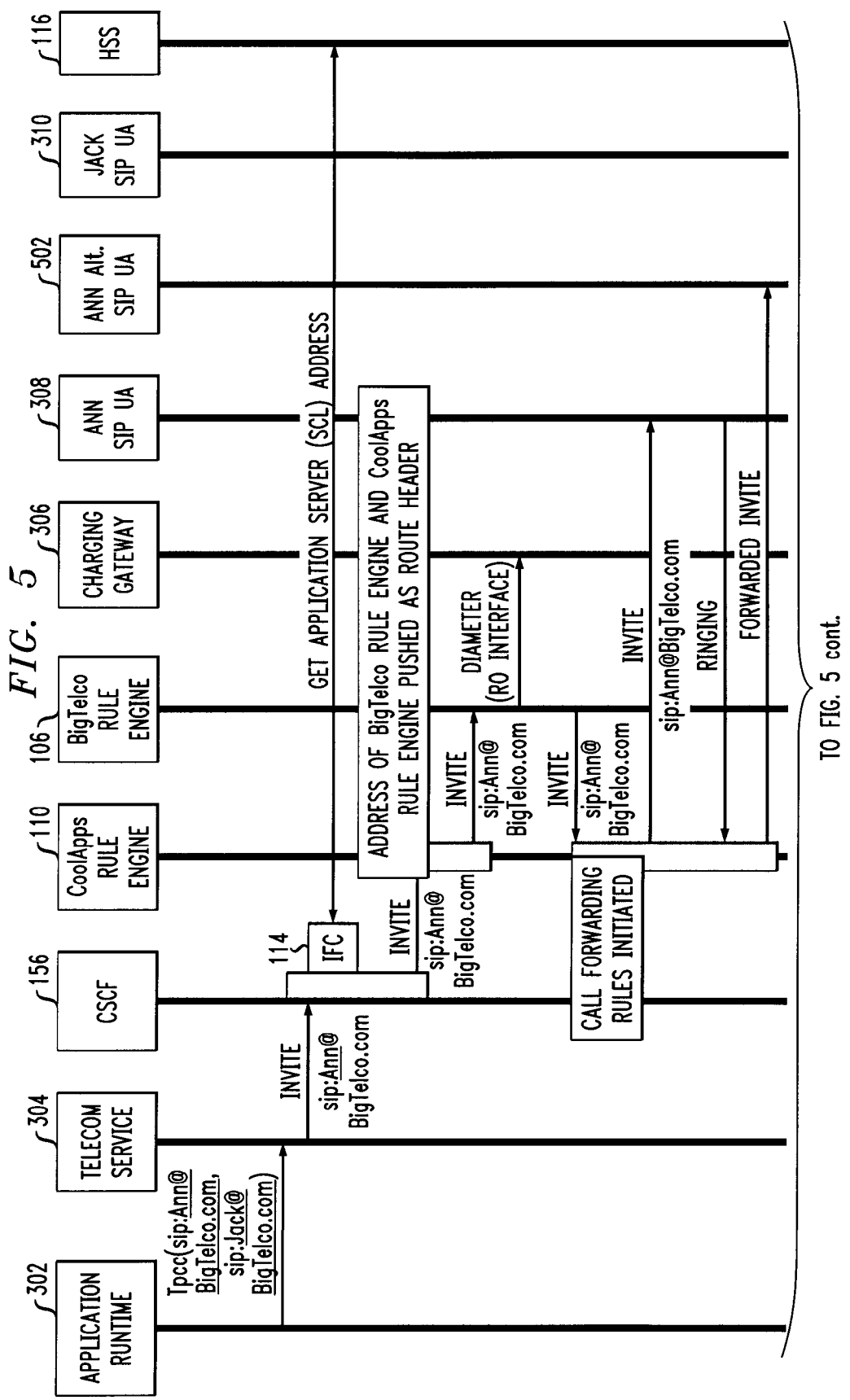
FIG. 5 is an execution time timeline, under the premium plan, according to still another aspect of the invention.
Figure 5:
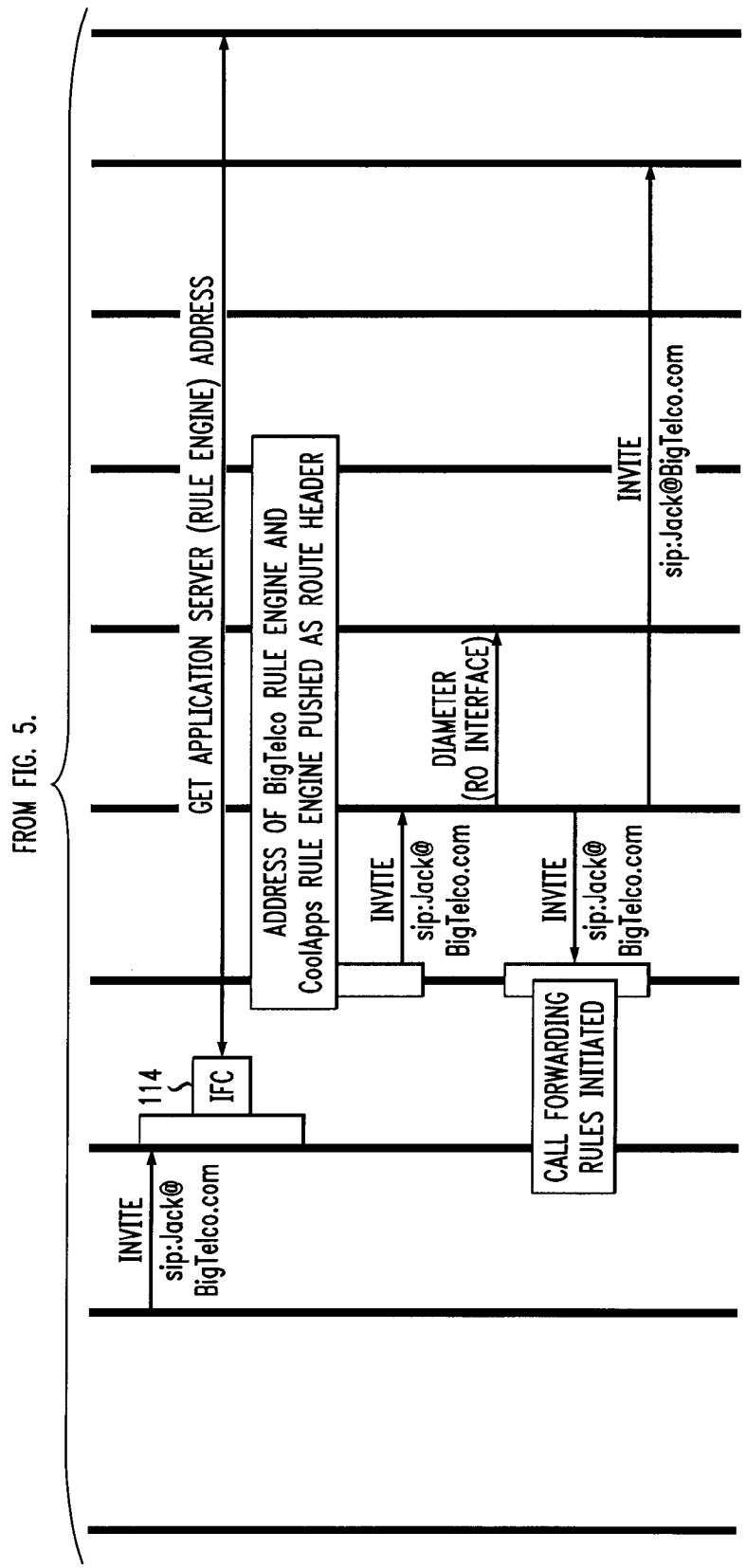

With reference to FIG. 5, at execution time, there is an authorization for the user (here, Ann) calling Jack. Initially, note the arrow between application runtime 302 and telecom service 304. This triggers invites for each party from the telecom service 304 to the CSCF 156 and iFC 114. The invite for Ann (Bob) is then passed to the CoolApps rule engine 110 and invites for both parties are passed to the BigTelco rules engine 106. Note the address of both rules engines are pushed as a route header. The invites are then passed to the Ann (Bob) SIP UA 308 or the Jack (Joshua) SIP UA 310 as the case may be. In each case, the application server address is obtained from HSS block 116. Charging of the user by BigTelco takes place (for example, a free charge) using charging gateway 306 (note arrows labeled "Diameter (Ro Interface)" as discussed above. If Jack's phone is ringing, the CoolApps rule engine forwards the call to Jack's alternate SIP device 502. Once again, the call is free. In any case, call forwarding rules can be initiated by sending invites back from BigTelco rule engine 106 to Cool Apps rule engine 110.

One or more embodiments of the invention advantageously address the scope of provisioning and execution of telecom protocol event-specific rules in a heterogeneous application and operator infrastructure. Furthermore, one or more embodiments of the invention provide a method and system to enable operators and third party application developers alike with the ability to specify and invoke enriched functional behavior within an IMS session. In particular, one or more instances of the invention provide a holistic solution that includes:
 (i) specification of rules at the application and operator domains,
 (ii) provisioning of the rules with appropriate trigger conditions at the appropriate domains, and/or
 (iii) runtime execution of these rules (and their associated actions), thereby leading to effective blending of value-added (e.g. SOA) capabilities in IMS services.

Significant aspects of one or more embodiments of the invention thus include not only the techniques that are used to specify, provision, and execute these rules but also the overall objective of enhancing IMS-based service delivery platforms that harness across the telecom operators' domain 108 and the application operators' domains 102. This integration (and runtime invocation) of capabilities across these two disparate domains is believed to afford significant advantages in one or more instances of the invention.

Furthermore, one or more embodiments advance the current state-of-art in IMS application development by providing support for runtime control, coordination and enrichment of functional behaviors of next-generation IMS services, based on telecom protocol events captured from the underlying IMS infrastructure. It is believed that such support is desirable for IMS services to flourish and generate new revenues for the IMS operator.

Figure 6:
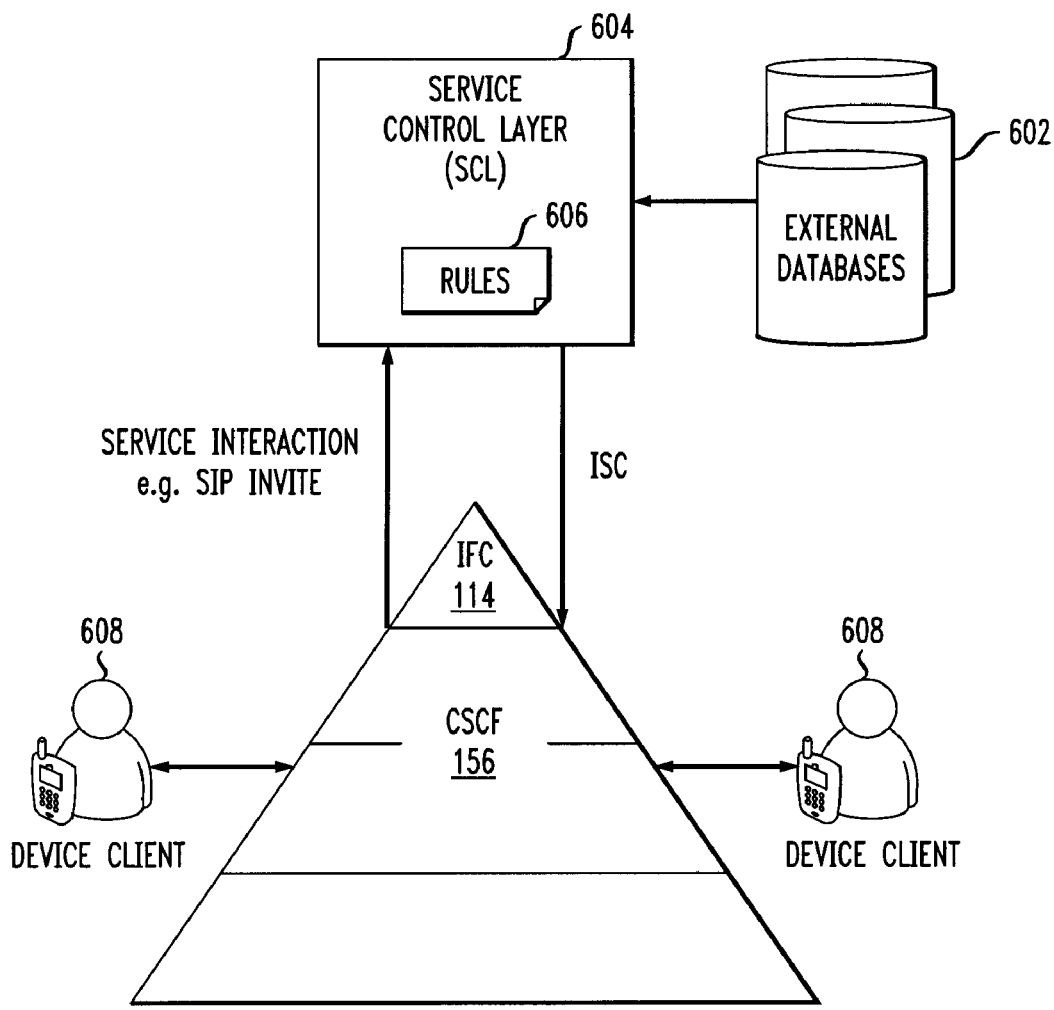
FIG. 6 is a service control layer—functional model, according to a further aspect of the invention.

FIG. 6 shows an exemplary service control layer functional model in which service control layer 604 interfaces with external databases 602 and implements rules 606. Layer 604 also interfaces with IFC 114 and CSCF 156 (for example, using ISC); IFC 114 and CSCF 156 in turn interface with one or more device clients 608 (for example, via a service interaction such as a SIP INVITE). Please note that client 608 is functionally similar to elements 308, 502, and 310; SCL 604 is functionally similar to elements 110 and 106; and rules 606 are functionally similar to elements 152 and 154.

Figure 7:
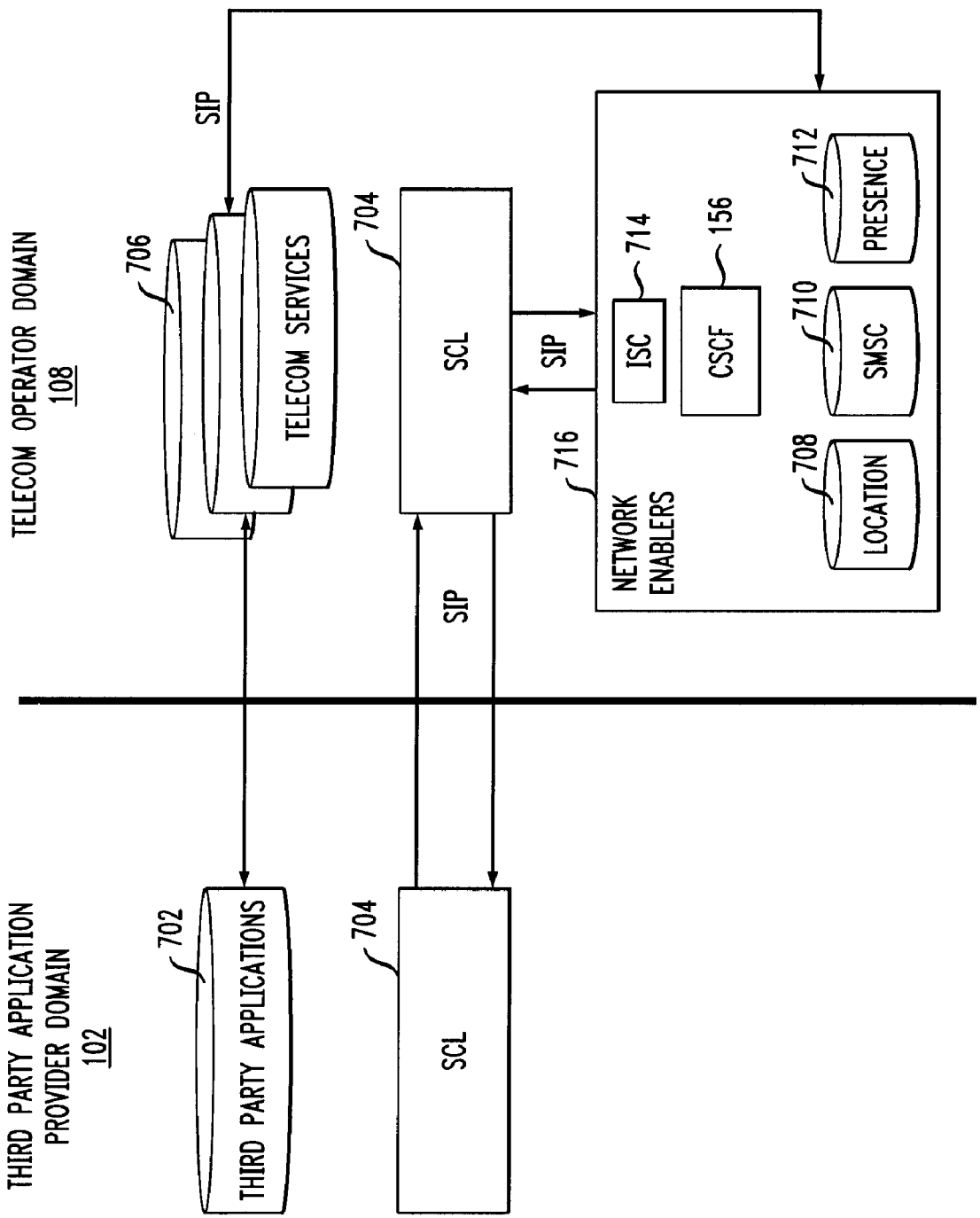
FIG. 7 depicts a first signaling architecture approach, according to a still further aspect of the invention.

FIG. 7 shows a first non-limiting exemplary signaling architecture. Third party applications 702 in third party application provider domain 102 interface with telecom services 706 in telecom operator domain 108. Telecom services 706 interface with network enablers 716 using SIP. SCL block 704 on the "app provider" side 102 interfaces with corresponding SCL block 704 on the telco side 108, also using SIP. SIP is also used for SCL block 704 on the telco side 108 to interface with network enablers 716. Network enablers 716 include location 708, Short message service center or SMSC 710, and presence 712; note also ISC and CSCF blocks 714, 156 respectively.

Figure 8:
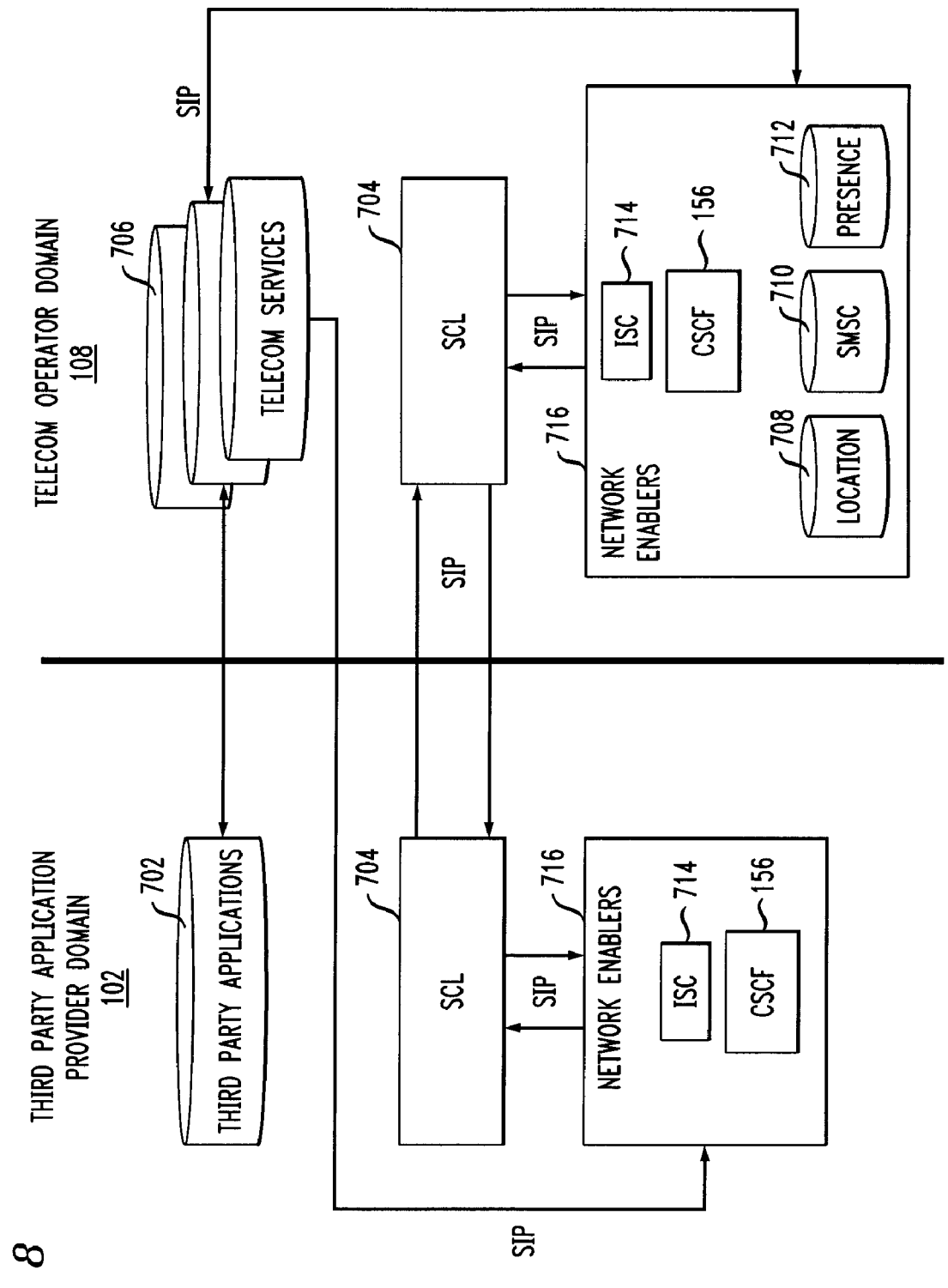
FIG. 8 depicts a second signaling architecture approach, according to an even further aspect of the invention.

FIG. 8 shows a second non-limiting exemplary signaling architecture. Third party applications 702 in third party application provider domain 102 interface with telecom services 706 in telecom operator domain 108. Telecom services 706 interface with network enablers 716 on telco side 108 using SIP. SCL block 704 on the "app provider" side 102 interfaces with corresponding SCL block 704 on the telco side 108, also using SIP. SIP is also used for SCL block 704 on the telco side 108 to interface with network enablers 716 on the telco side, which can be similar to those described for FIG. 7. Network enablers 716 are also present here on the "app provider" side 102; again note ISC and CSCF blocks 714, 156 respectively. SIP is used for signaling between SCL block 704 on the "app provider" side and network enablers 716 on the "app provider" side. SIP is also used between network enablers 716 on the "app provider" side and telecom services 706 in telecom operator domain 108.

Figure 9:
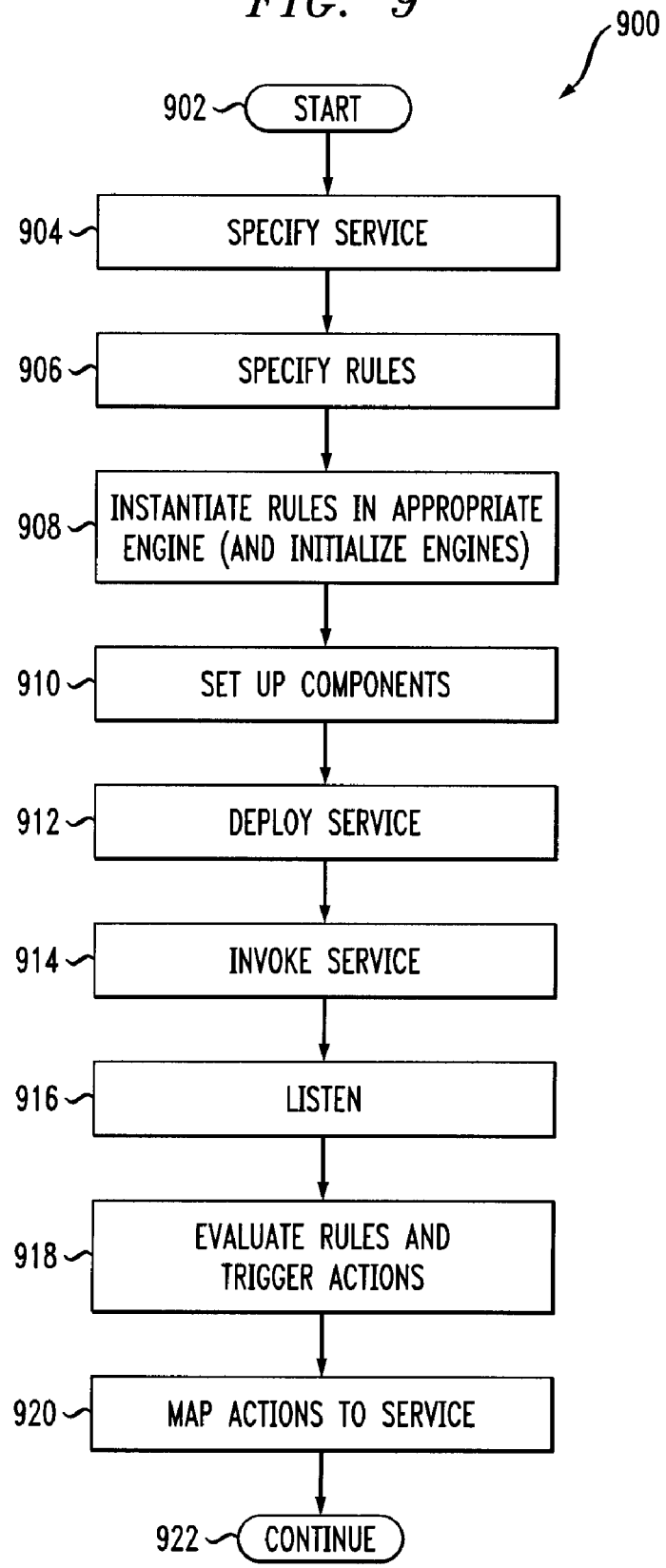
FIG. 9 presents a flow chart of exemplary method steps, according to another aspect of the invention.

With reference to flow chart 900 of FIG. 9, an exemplary method begins at block 902. Optional steps 904 and 906 are discussed below. Step 908 includes instantiating (i) a plurality of pure operator type rules within a domain 108 of a telecommunications operator and (ii) a plurality of pure application type rules within a domain 102 of a third party telecommunications application provider. The plurality of pure operator type rules and the plurality of pure application type rules are associated with a composite service.

Step 910 includes establishing a plurality of network components to transmit protocol-level events to the domain 108 of the telecommunications operator and/or the domain 102 of the third party telecommunications application provider. Step 912 includes deploying the composite service in an execution engine 112 of the third party telecommunications application provider.

Optional but preferred steps include specifying the composite service, as per step 904, and specifying a plurality of rules, as per step 906. Step 904 is preferably carried out by the third party telecommunications application provider 102; most preferably by the service creation environment 104. In step 906, the rules include the aforementioned pure application type rules and the pure operator type rules. Rules are typically specified during application design and development cycle and they are extracted and identified to be either application type rules or operator type rules based on the conditions specified elsewhere herein. A human operator typically performs the rule specification; optionally, with due consultation with rules repositories 152 and/or 154 in the rule engine(s) 110 and/or 106.

In one or more embodiments, in step 908, the instantiating of the plurality of pure operator type rules within the domain of the telecommunications operator includes instantiating the plurality of pure operator type rules within an operator rule engine 106 within the domain 108 of the telecommunications operator; further, the instantiating of the plurality of pure application type rules within the domain of the third party telecommunications application provider includes instantiating the plurality of pure application type rules within a developer (application domain) rule engine 110 within the domain 102 of the third party telecommunications application provider. Furthermore, the plurality of network components set up in step 910 transmit given protocol-level events to domain 102 and/or domain 108 by transmitting to the corresponding engine 110, 106 as the case may be.

Step 914 includes invoking the composite service during execution of an application. Step 914 can be carried out, for example, by engine 112. Step 916 includes listening, with the listener modules 120, 158, for exchange of protocol-level conversational messages between parties engaged in the composite service, in order to identify corresponding ones of the protocol level events. The parties include the application and at least one user. Step 918 includes evaluating, with the rule engines 106, 110, appropriate ones of the rules and triggering actions at required points during network level events. Note that (SIP) protocol level events and network level events are used interchangeably herein as SIP enabled networks are considered as the underlying network infrastructure. Examples of events are SIP INVITE, BYE, corresponding to initialization of a call and termination of a call, respectively. Step 920 includes mapping the actions to the service(s), using execution engine 112. The rules execution engine typically maps the actions to appropriate services and thus could chain or compose various services together on the trigger of an event. In one or more embodiments, as far as the event generation is concerned, consider a single telecom service to generate the events.

Processing continues in step 922.

As discussed above, the rules have action parts, and may also have condition parts. In step 908, the action parts (and optionally, the condition parts) can be used to determine what type of rule a given rule is; for example, pure operator, pure application, or unclassified, using criteria as set forth above. Step 908 can also include initializing the operator and developer rule engines 106, 110.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 10:
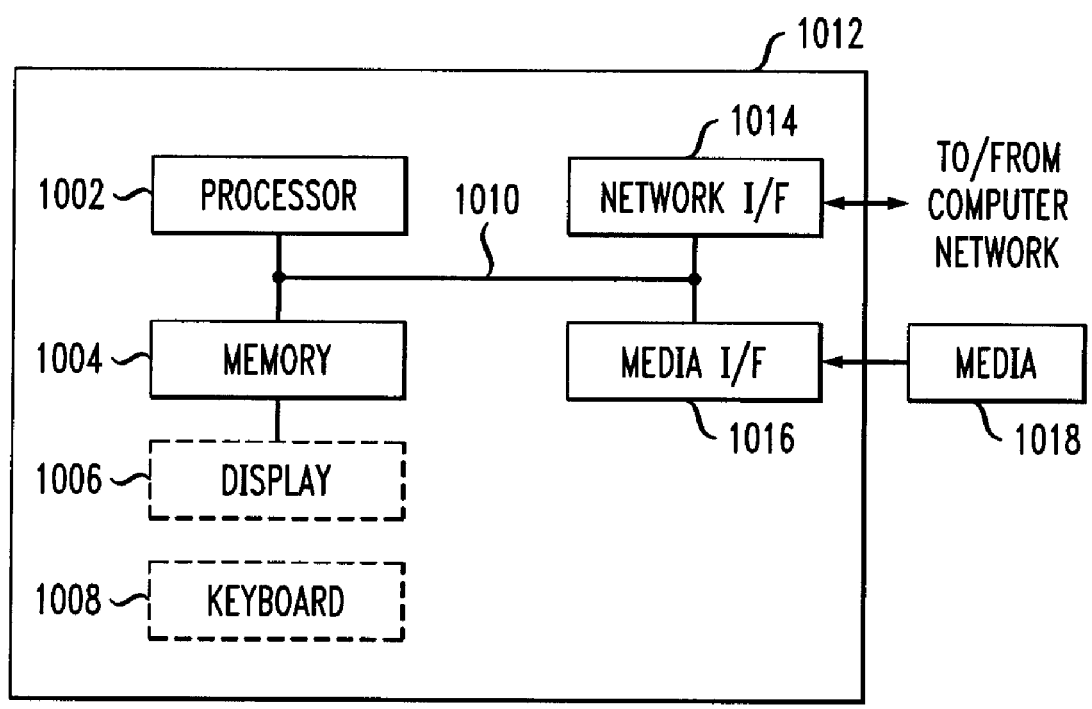
FIG. 10 depicts a computer system that may be useful in implementing one or more aspects and/or elements of the invention.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1018) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable recordable storage medium (as distinct from a propagation or transmission medium) include a semiconductor or solid-state memory (for example memory 1004), magnetic tape, a removable computer diskette (for example media 1018), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1002 coupled directly or indirectly to memory elements 1004 through a system bus 1010. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable recordable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable recordable storage medium; the modules can include, for example, any or all of the components shown in FIGS. 1, 3, and 5-8. The method steps can then be carried out using the distinct software modules and/or sub-modules of the system, as described above, executing on one or more hardware processors (for example, a first hardware processor associated with the application domain 102 and a second hardware processor associated with the operator domain 108—the first and second hardware processors could each themselves comprise one or more individual interconnected processors). Further, a computer program product can include a tangible computer-readable recordable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:

independently instantiating a plurality of pure operator type rules within a domain of a telecommunications operator and a plurality of pure application type rules within a domain of a third party telecommunications application provider, said plurality of pure operator type rules and said plurality of pure application type rules being associated with a composite service, wherein instantiating a plurality of pure operator type rules within a domain of a telecommunications operator and a plurality of pure application type rules within a domain of a third party telecommunications application provider is carried out by a module executing on a hardware processor;

establishing a plurality of network components to transmit given events of a plurality of protocol-level events to at least one of said domain of said telecommunications operator and said domain of said third party telecommunications application provider, wherein establishing a plurality of network components is carried out by a module executing on a hardware processor; and deploying said composite service in an execution engine of said third party telecommunications application provider, wherein deploying said composite service in an execution engine of said third party telecommunications application provider comprises run-time execution of the plurality of pure operator type rules and the plurality of pure application type rules independently in each respective domain, wherein deploying said composite service is carried out by a module executing on a hardware processor.

2. The method of claim 1, further comprising:
specifying said composite service, said specifying of said composite service being carried out by said third party telecommunications application provider; and
specifying a plurality of rules comprising at least said pure application type rules and said pure operator type rules.

3. The method of claim 2, wherein:
said instantiating of said plurality of pure operator type rules within said domain of said telecommunications operator comprises instantiating said plurality of pure operator type rules within an operator rule engine within said domain of said telecommunications operator;
said instantiating of said plurality of pure application type rules within said domain of said third party telecommunications application provider comprises instantiating said plurality of pure application type rules within an application domain rule engine within said domain of said third party telecommunications application provider; and
said plurality of network components transmit said given events of said plurality of protocol-level events to said at least one of said domain of said telecommunications operator and said domain of said third party telecommunications application provider by transmitting said plurality of protocol-level events to a corresponding one of said operator rule engine and said application domain rule engine.

4. The method of claim 3, further comprising providing a system, wherein said system comprises distinct software modules, each of said distinct software modules being embodied on a tangible computer-readable recordable storage medium, and wherein said distinct software modules comprise a service creation environment module, an operator rule engine module, an application domain rule engine module, and an application domain execution engine module; wherein:
said execution engine of said third party telecommunications application provider is implemented by said application domain execution engine module executing on a first hardware processor;
said operator rule engine is implemented by said operator rule engine module executing on a second hardware processor;
said application domain rule engine is implemented by said application domain rule engine module executing on said first hardware processor; and
said specifying of said composite service is carried out by said service creation environment module executing on said first hardware processor.

5. The method of claim 4, wherein said distinct software modules further comprise:
an operator listener module within said operator rule engine; and
an application domain listener module within said application domain rule engine;
further comprising:
invoking said composite service during execution of an application, said invoking of said composite service being carried out by said application domain execution engine module executing on said first hardware processor;
listening, with said application domain listener module executing on said first hardware processor and said operator listener module executing in said second hardware processor, for exchange of protocol-level conversational messages between parties engaged in said composite service, to identify corresponding ones of said protocol level events, said parties comprising said application and at least one user;
evaluating, with said application domain rule engine module executing on said first hardware processor and said operator domain rule engine module executing in said second hardware processor, appropriate ones of said rules and triggering actions at required points during network level events; and
mapping said actions to said service, using said execution engine module executing on said first hardware processor.

6. The method of claim 4, wherein:
said rules of said plurality of rules comprise action parts;
said instantiating of said plurality of pure operator type rules comprises determining that said plurality of pure operator type rules are of pure operator type based on said action parts of said pure operator type rules; and
said instantiating of said plurality of pure application type rules comprises determining that said plurality of pure application type rules are of pure application type based on said action parts of said pure application type rules;
further comprising initializing said operator and application domain rule engines.

7. The method of claim 6, wherein:
said rules of said plurality of rules further comprise condition parts;
said determining that said plurality of pure operator type rules are of pure operator type based on said action parts of said pure operator type rules comprises determining that said action parts are services owned by said telecommunications operator and not exposed to applications using service access protocols; and
said determining that said plurality of pure application type rules are of pure application type based on said action parts of said pure application type rules comprises determining that said action parts are services that are purely owned by a corresponding application;
further comprising:
classifying a given one of said pure application type rules as pure application type, if said condition part of said given one of said pure application type rules is owned by a corresponding application and said action part of said given one of said pure application type rules is exposed to at least one of said telecommunications operator and said third party telecommunications application provider;
classifying a given one of said pure operator type rules as pure operator type, if said condition part of said given one of said pure operator type rules is owned by said telecommunications operator and said action part of said given one of said pure operator type rules is exposed to at least one of said telecommunications operator and said third party telecommunications application provider; and
otherwise classifying a given rule of said plurality of rules as unclassified.

8. A computer program product comprising a tangible computer readable recordable storage medium including computer usable program code, said computer program product including:
computer usable program code for independently instantiating a plurality of pure operator type rules within a domain of a telecommunications operator and a plurality of pure application type rules within a domain of a third party telecommunications application provider, said plurality of pure operator type rules and said plurality of pure application type rules being associated with a composite service;

computer usable program code for establishing a plurality of network components to transmit given events of a plurality of protocol-level events to at least one of said domain of said telecommunications operator and said domain of said third party telecommunications application provider; and computer usable program code for deploying said composite service in an execution engine of said third party telecommunications application provider, wherein deploying said composite service in an execution engine of said third party telecommunications application provider comprises run-time execution of the plurality of pure operator type rules and the plurality of pure application type rules independently in each respective domain.

9. The computer program product of claim 8, further comprising:

computer usable program code for specifying said composite service, said specifying of said composite service being carried out by said third party telecommunications application provider; and computer usable program code for specifying a plurality of rules comprising at least said pure application type rules and said pure operator type rules.

10. The computer program product of claim 9, wherein:

said computer usable program code for instantiating of said plurality of pure operator type rules within said domain of said telecommunications operator comprises computer usable program code for instantiating said plurality of pure operator type rules within an operator rule engine within said domain of said telecommunications operator;

said computer usable program code for instantiating of said plurality of pure application type rules within said domain of said third party telecommunications application provider comprises computer usable program code for instantiating said plurality of pure application type rules within an application domain rule engine within said domain of said third party telecommunications application provider; and said plurality of network components transmit said given events of said plurality of protocol-level events to said at least one of said domain of said telecommunications operator and said domain of said third party telecommunications application provider by transmitting said plurality of protocol-level events to a corresponding one of said operator rule engine and said application domain rule engine.

11. The computer program product of claim 10, further comprising distinct software modules, each of said distinct software modules being embodied on said tangible computer-readable recordable storage medium, said distinct software modules comprising a service creation environment module, an operator rule engine module, an application domain rule engine module, and an application domain execution engine module;

wherein:
said execution engine of said third party telecommunications application provider comprises said application domain execution engine module;
said operator rule engine comprises said operator rule engine module;
said application domain rule engine comprises said application domain rule engine module; and
said service creation environment module comprises said computer usable program code for specifying of said composite service.

12. The computer program product of claim 11, wherein said distinct software modules further comprise:

an operator listener module within said operator rule engine; and
an application domain listener module within said application domain rule engine;

further comprising:
computer usable program code for invoking said composite service during execution of an application, said application domain execution engine module comprising said computer usable program code for invoking said composite service during execution of said application;
computer usable program code for listening for exchange of protocol-level conversational messages between parties engaged in said composite service, to identify corresponding ones of said protocol level events, said parties comprising said application and at least one user, said application domain listener module and said operator listener module comprising said computer usable program code for listening for exchange of protocol-level conversational messages;
computer usable program code for evaluating appropriate ones of said rules and triggering actions at required points during network level events, said application domain rule engine module and said operator domain rule engine module comprising said computer usable program code for evaluating appropriate ones of said rules; and
computer usable program code for mapping said actions to said service, said execution engine module comprising said computer usable program code for mapping said actions to said service.

13. The computer program product of claim 11, wherein:
said rules of said plurality of rules comprise action parts;
said computer usable program code for instantiating of said plurality of pure operator type rules comprises computer usable program code for determining that said plurality of pure operator type rules are of pure operator type based on said action parts of said pure operator type rules; and
said computer usable program code for instantiating of said plurality of pure application type rules comprises computer usable program code for determining that said plurality of pure application type rules are of pure application type based on said action parts of said pure application type rules;
further comprising computer usable program code for initializing said operator and application domain rule engines.

14. The computer program product of claim 13, wherein:
said rules of said plurality of rules further comprise condition parts;
said computer usable program code for determining that said plurality of pure operator type rules are of pure operator type based on said action parts of said pure operator type rules comprises computer usable program code for determining that said action parts are services owned by said telecommunications operator and not exposed to applications using service access protocols; and
said computer usable program code for determining that said plurality of pure application type rules are of pure application type based on said action parts of said pure application type rules comprises computer usable program code for determining that said action parts are services that are purely owned by a corresponding application;

further comprising:

computer usable program code for classifying a given one of said pure application type rules as pure application type, if said condition part of said given one of said pure application type rules is owned by a corresponding application and said action part of said given one of said pure application type rules is exposed to at least one of said telecommunications operator and said third party telecommunications application provider;

computer usable program code for classifying a given one of said pure operator type rules as pure operator type, if said condition part of said given one of said pure operator type rules is owned by said telecommunications operator and said action part of said given one of said pure operator type rules is exposed to at least one of said telecommunications operator and said third party telecommunications application provider; and computer usable program code for otherwise classifying a given rule of said plurality of rules as unclassified.

15. An apparatus comprising:

a memory; and at least one processor, coupled to said memory, and operative to:

independently instantiate a plurality of pure operator type rules within a domain of a telecommunications operator and a plurality of pure application type rules within a domain of a third party telecommunications application provider, said plurality of pure operator type rules and said plurality of pure application type rules being associated with a composite service;

establish a plurality of network components to transmit given events of a plurality of protocol-level events to at least one of said domain of said telecommunications operator and said domain of said third party telecommunications application provider; and deploy said composite service in an execution engine of said third party telecommunications application provider, wherein deploying said composite service in an execution engine of said third party telecommunications application provider comprises run-time execution of the plurality of pure operator type rules and the plurality of pure application type rules independently in each respective domain.

16. The apparatus of claim 15, wherein said at least one processor is further operative to:

specify said composite service, said specifying of said composite service being carried out by said third party telecommunications application provider; and specify a plurality of rules comprising at least said pure application type rules and said pure operator type rules.

17. The apparatus of claim 16, wherein:

said at least one processor is operative to instantiate said plurality of pure operator type rules within said domain of said telecommunications operator by instantiating said plurality of pure operator type rules within an operator rule engine within said domain of said telecommunications operator;

said at least one processor is operative to instantiate said plurality of pure application type rules within said domain of said third party telecommunications application provider by instantiating said plurality of pure application type rules within an application domain rule engine within said domain of said third party telecommunications application provider; and said plurality of network components transmit said given events of said plurality of protocol-level events to said at least one of said domain of said telecommunications operator and said domain of said third party telecommunications application provider by transmitting said plurality of protocol-level events to a corresponding one of said operator rule engine and said application domain rule engine.

18. The apparatus of claim 17, further comprising a tangible computer-readable recordable storage medium having distinct software modules embodied thereon, wherein said distinct software modules comprise a service creation environment module, an operator rule engine module, an application domain rule engine module, and an application domain execution engine module;

wherein:

said execution engine of said third party telecommunications application provider is implemented by said application domain execution engine module executing on said at least one processor;

said operator rule engine is implemented by said operator rule engine module executing on said at least one processor;

said application domain rule engine is implemented by said application domain rule engine module executing on said at least one processor; and said specifying of said composite service is carried out by said service creation environment module executing on said at least one processor.

19. The apparatus of claim 18, wherein said distinct software modules further comprise:

an operator listener module within said operator rule engine; and an application domain listener module within said application domain rule engine;

wherein said at least one processor is further operative to:

invoke said composite service during execution of an application, said invoking of said composite service being carried out by said application domain execution engine module executing on said first hardware processor;

listen, with said application domain listener module and said operator listener module, for exchange of protocol-level conversational messages between parties engaged in said composite service, to identify corresponding ones of said protocol level events, said parties comprising said application and at least one user;

evaluate, with said application domain rule engine module and said operator domain rule engine module, appropriate ones of said rules and triggering actions at required points during network level events; and map said actions to said service, using said execution engine module.

20. The apparatus of claim 18, wherein:

said rules of said plurality of rules comprise action parts;

said at least one processor is operative to instantiate said plurality of pure operator type rules by determining that said plurality of pure operator type rules are of pure operator type based on said action parts of said pure operator type rules;

said at least one processor is operative to instantiate said plurality of pure application type rules by determining that said plurality of pure application type rules are of pure application type based on said action parts of said pure application type rules; and said at least one processor is further operative to initialize said operator and application domain rule engines.

21. The apparatus of claim 20, wherein:

said rules of said plurality of rules further comprise condition parts;

said at least one processor is operative to determine that said plurality of pure operator type rules are of pure operator type based on said action parts of said pure operator type rules by determining that said action parts are services owned by said telecommunications operator and not exposed to applications using service access protocols; and said at least one processor is operative to determine that said plurality of pure application type rules are of pure application type based on said action parts of said pure application type rules by determining that said action parts are services that are purely owned by a corresponding application;

wherein said at least one processor is further operative to:

classify a given one of said pure application type rules as pure application type, if said condition part of said given one of said pure application type rules is owned by a corresponding application and said action part of said given one of said pure application type rules is exposed to at least one of said telecommunications operator and said third party telecommunications application provider;

classify a given one of said pure operator type rules as pure operator type, if said condition part of said given one of said pure operator type rules is owned by said telecommunications operator and said action part of said given one of said pure operator type rules is exposed to at least one of said telecommunications operator and said third party telecommunications application provider; and otherwise classify a given rule of said plurality of rules as unclassified.

22. An apparatus comprising:

means for independently instantiating a plurality of pure operator type rules within a domain of a telecommunications operator and a plurality of pure application type rules within a domain of a third party telecommunications application provider, said plurality of pure operator type rules and said plurality of pure application type rules being associated with a composite service;

means for establishing a plurality of network components to transmit given events of a plurality of protocol-level events to at least one of said domain of said telecommunications operator and said domain of said third party telecommunications application provider; and means for deploying said composite service in an execution engine of said third party telecommunications application provider, wherein deploying said composite service in an execution engine of said third party telecommunications application provider comprises runtime execution of the plurality of pure operator type rules and the plurality of pure application type rules independently in each respective domain.

* * * * *